(12) United States Patent
Oehmann

(10) Patent No.: US 7,226,194 B2
(45) Date of Patent: Jun. 5, 2007

(54) EXTERIOR REARVIEW MIRROR FOR MOTOR VEHICLES

(75) Inventor: Roland Oehmann, Stuttgart (DE)

(73) Assignee: Schefenacker Patents S.a.r.l., Luxembourg (LU)

(*) Notice: Subject to any disclaimer, the term of this patent is extended or adjusted under 35 U.S.C. 154(b) by 0 days.

(21) Appl. No.: 10/547,029

(22) PCT Filed: Feb. 21, 2004

(86) PCT No.: PCT/DE2004/000328

§ 371 (c)(1), (2), (4) Date: Aug. 25, 2005

(87) PCT Pub. No.: WO2004/076236

PCT Pub. Date: Sep. 10, 2004

(65) Prior Publication Data

US 2006/0146429 A1     Jul. 6, 2006

(30) Foreign Application Priority Data

Feb. 26, 2003    (DE)  ................................ 103 08 073

(51) Int. Cl.
*F21W 101/02* (2006.01)

(52) U.S. Cl. .................. 362/494; 362/540; 362/544; 362/545; 362/546

(58) Field of Classification Search ............. 362/494, 362/487, 540, 543, 544, 545, 546
See application file for complete search history.

(56) References Cited

U.S. PATENT DOCUMENTS

| 6,572,250 | B1* | 6/2003 | Assinder et al. ............ 362/494 |
| 6,817,742 | B2* | 11/2004 | Lin ............................ 362/494 |
| 2005/0105299 | A1* | 5/2005 | Gilbert et al. .............. 362/494 |
| 2006/0092651 | A1* | 5/2006 | Huang ........................ 362/494 |

FOREIGN PATENT DOCUMENTS

| EP | 0 738 627 | 6/2002 |
| FR | 2 821 308 | 8/2002 |
| WO | WO 00/55009 | 9/2000 |
| WO | WO 01/28815 | 4/2001 |
| WO | WO 01/59734 | 8/2001 |

* cited by examiner

*Primary Examiner*—Laura K. Tso

(57) ABSTRACT

Exterior rearview mirrors have mirror base, a mirror body, and a lighting unit with a lighting means. A lighting unit can be a repeating direction indicator lamp or, for example, a lamp for illuminating the surroundings. In order to enable the lighting unit to be easily mounted while requiring little mounting space, the lighting unit is part of an add-on element, which is physically separate from the exterior rearview mirror. The lighting unit with the lighting means can be easily produced and mounted. No mounting space is required inside the exterior rearview mirror. The lighting unit can be easily accessed for mounting. The exterior rearview mirror is used in motor vehicles.

17 Claims, 3 Drawing Sheets

EXTERIOR REARVIEW MIRROR FOR MOTOR VEHICLES

CROSS-REFERENCE TO RELATED APPLICATIONS

This application is a National Stage of International Application No. PCT/DE2004/000328, filed Feb. 21, 2004, which claims priority to DE 103 08 073.2 filed Feb. 26, 2003. The disclosure(s) of the above application(s) is (are) incorporated herein by reference.

FIELD OF THE INVENTION

The invention concerns an exterior rearview mirror for vehicles, preferably motor vehicles.

BACKGROUND OF THE INVENTION

It is known to use a lighting unit in the mirror body or in the mirror base as a turn signal repeater lamp or as a perimeter light. The lighting unit takes up space in the mirror body that might be required for other components, such as a positioning drive for the mirror glass, a pivot drive for the mirror body, and the like. Moreover, installation of the lighting unit within the exterior rearview mirror is costly. If it is necessary to replace the lighting unit, the corresponding connector contacts have to be disconnected and reconnected, which is awkward and difficult inside the exterior rearview mirror.

An object of the present invention is to design an exterior rearview mirror of the generic type such that the lighting unit can be installed in a simple manner while taking little installation space.

SUMMARY OF THE INVENTION

In the inventive exterior rearview mirror, the lighting unit is part of the add-on element, which is physically separate from the exterior rearview mirror. Consequently, the lighting unit and the lighting means can be manufactured and installed easily. No installation space is required in the exterior rearview mirror. Since the lighting unit is part of the add-on element, easy replacement of the lighting unit or of the add-on element is possible. The lighting unit is not located in the mirror body or in the mirror base of the exterior rearview mirror, so it is easily accessible for installation.

Additional features of the invention are apparent from the other claims, the description, and the drawings.

BRIEF DESCRIPTION OF THE DRAWINGS

The invention is explained in detail below on the basis of some example embodiments shown in the drawings. The drawings show.

DETAILED DESCRIPTION OF THE PREFERRED EMBODIMENTS

Figure 1:
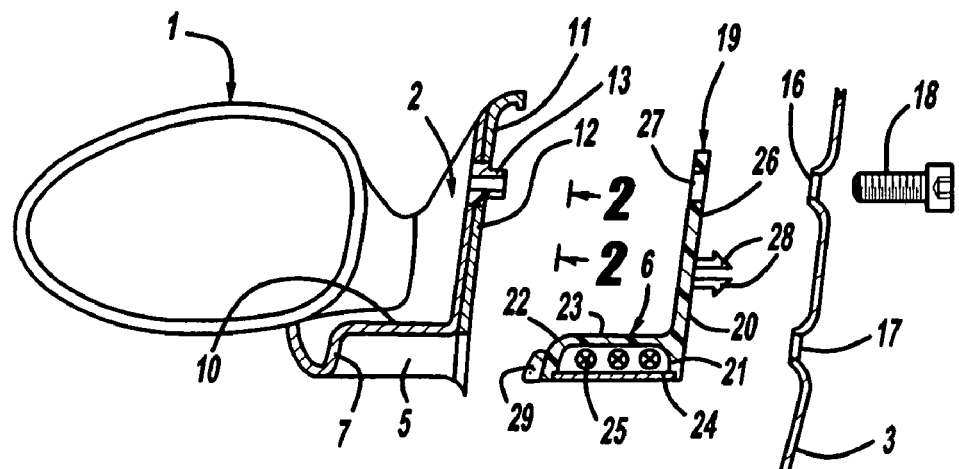
FIG. 1 is an exploded and partially sectional view of a first embodiment of an exterior rearview mirror, according to the present invention.
Figure 2:
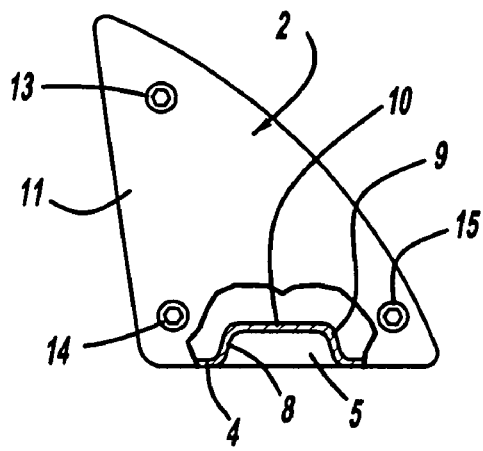
FIG. 2 is a partially sectional view taken along the Lines 2—2 in FIG. 1, according to the present invention.

The exterior rearview mirror from FIGS. 1 and 2 has a mirror body 1 and a mirror base 2 by which the exterior rearview mirror can be attached to the motor vehicle. Shown in FIG. 1 by way of an example is part of the door panel 3 of the motor vehicle. The mirror base 2 can be attached to the door panel 3 in a known manner, for example by latching, hooking, screw-mounting, or other known fastening possibilities. The mirror body 1 is foldable relative to the mirror base 2, preferably to the back and to the front viewed in the direction of travel. The exterior rearview mirror shown in FIGS. 1 and 2 is designed as a single-axis mirror in which the mirror body 1 pivots about the same vertical axis when folding to the front and to the back. Since such pivot designs are known in exterior rearview mirrors, they are not described in detail here.

The mirror base 2 has on its underside 4, facing the ground, a receiving space 5 in which is accommodated a lighting unit 6. In order to produce the receiving space 5, the underside 4 of the mirror base is shaped appropriately (FIG. 2). The receiving space 5 is located approximately midway across the width of the mirror base 2 and is delimited to the outside by a rear wall 7 and to the front and back in the direction of travel by side walls 8, 9.

At the top, the receiving space 5 is bounded by a roof 10, which transitions into an upwardly oriented contact wall 11 of the mirror base 2 (FIG. 1). The contact wall 11 is advantageously equipped with a seal 12. As can be seen from FIGS. 1 and 2, the contact wall 11, which in the example embodiment has an approximately triangular outline, is provided with three sockets 13–15, which project beyond the contact wall 11, pass through the seal 12, and in the installed position engage openings 16, 17 in the door panel 3. The sockets 13–15 function together with threaded studs 18, which fasten the exterior rearview mirror to the door panel 3.

The lighting unit 6 is part of an add-on element 19, which in the installed position of the exterior rearview mirror is located between the door panel 3 and the mirror base 2. The add-on element 19 has a housing 20, whose outer contour is matched to the interior shape of the receiving space 5 of the mirror base 2. The housing 20 has a rear wall 21, a front wall 22, side walls (not shown), and a top wall 23. In the installed position, the housing 20 rests with these walls against the rear wall 7, the side walls 8, 9, and roof 10 of the receiving space 5. The housing 20 is closed at the bottom facing the ground by a lens 24, through which the light emitted by lighting means 25 in the housing 20 passes downward toward the ground. The lighting means 25 accommodated in the housing 20 are preferably LEDs, but may also be incandescent lamps or other lighting means known in automotive engineering. The lens 24 in the example embodiment is flat and in the installed position is flush with the underside 4 of the mirror base 2. The lens 24 may also be domed, for example, in accord with the design requirements of the mirror base 2.

Adjoining the top of the housing 20 is a rear wall 26, which extends the rear wall 21 of the housing 20, and in the installed position makes area contact with the seal 12. The rear wall 26 has openings 27 for the passage of the sockets 13–15 and for cables. The rear wall 26 is matched approximately to the outer contour of the seal 12. Projecting from the rear wall 26 are latching hooks 28, and a corresponding latching hole (not shown) in the door panel 3 is associated therewith.

The lighting unit 6 of the add-on element 19 constitutes a perimeter light, which can be attached to the door panel 3 of the motor vehicle by means of the latching hooks 28, independently of the exterior rearview mirror. In contrast to the example embodiment shown, it is also possible to fasten the add-on element 19 to the door panel 3 by hooking, screw-mounting, or other means. It is also possible to attach the add-on element 19 to the mirror base 2. Since the lighting unit 6 is part of the add-on element 19, there is no need to integrate the lighting unit 6 in the mirror base 2.

In the example embodiment shown, first, the add-on element 19 is attached to the door panel 3. Then the mirror base 2, together with the mirror body 1, are screwed onto the door panel 3 with threaded studs 18 in a known manner. The rear wall 26 of the add-on element 19 is covered by the mirror base 2, while the lighting unit 6 is accommodated in the receiving space 5 of the mirror base 2. The add-on element 19 is securely held by the mirror base 2. The region next to the vehicle door is illuminated by the light radiating downward from the lighting means 25, so this region is optimally lit when the vehicle is operating in poor lighting conditions.

With the exception of the lens 24, the add-on element 19 is designed as a single piece and is advantageously made of a plastic. Provided on the outside of the front wall 22 and on the side walls (not shown) of the housing 20 of the add-on element 19 is a seal 29, which prevents dirt from entering the receiving space 5.

Figure 3:
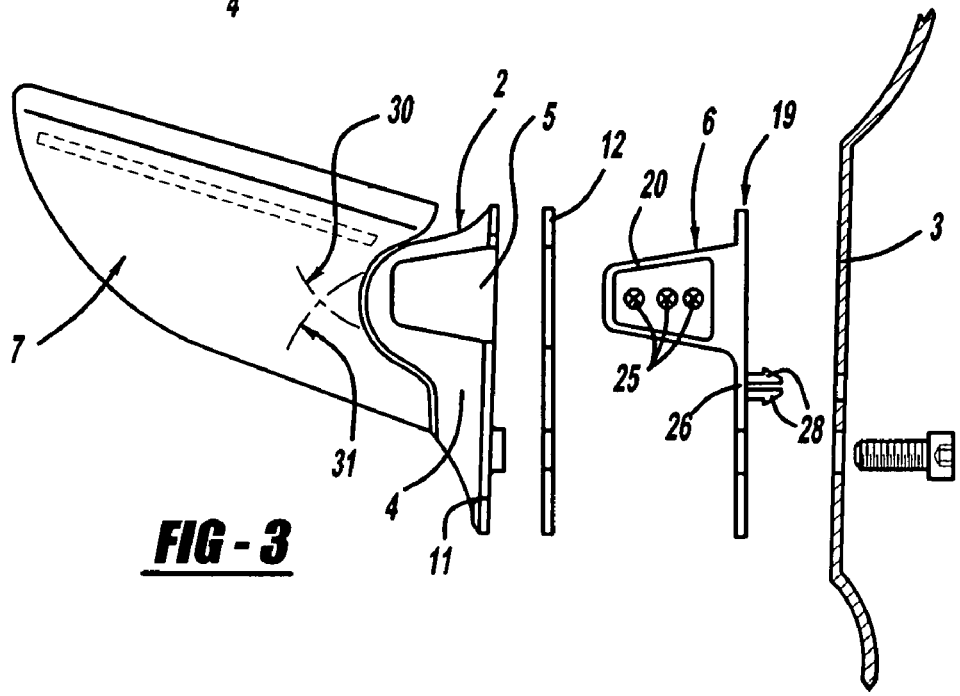
FIG. 3 is a second embodiment of an exterior rearview mirror, according to the present invention.

FIG. 3 shows an exterior rearview mirror in a dual-axis design. The mirror body 1 can pivot about an axis 30 or 31 in and counter to the vehicle's direction of travel. The two pivot axes 30, 31 are parallel to one another and, in a similar manner shown in FIGS. 1 and 2, extend upward. Such dual-axis mirrors are known, and thus are not explained in detail here.

The mirror base 2, as in the above embodiment, is equipped on its underside the receiving space 5, which accommodates the lighting unit 6 of the add-on element 19. In contrast to the previous example embodiment, the receiving space 5 is not located in the center of the underside 4, but instead is shifted toward the rear in the direction of travel in the underside 4. The receiving space 5 is otherwise designed essentially the same as in the previous embodiment. Of course, it is also possible to provide the receiving space 5 in the center of the underside 4 of the mirror base 2 in a dual-axis mirror.

The side of the contact wall 11 of the mirror base 2 facing the door panel 3 is provided with the seal 12, which is designed as a flat sealing disc and can be attached to the contact wall 11. It is also possible, however, to lodge the seal 12 between the contact wall 11 of the mirror base 2 and the rear wall 26 of the add-on element 19.

The rear wall 26 is designed as a single piece with the housing 20 of the lighting unit 6 accommodating the lighting means 25. In the installed position, the lighting means 25 radiate light downward toward the ground.

Projecting from the rear wall 26 of the add-on element 19 are the latching hooks 28 with which the add-on element 19 can be latched to the door panel 3.

In this embodiment as well, the add-on element 19 is a dimensionally stable, but somewhat elastic, component which is arranged as an independent unit between the mirror base 2 and the door panel 3. In corresponding fashion to the previous embodiment, the add-on element 19 forms a sort of adapter piece between the mirror base 2 and the vehicle door 3.

Figure 4:
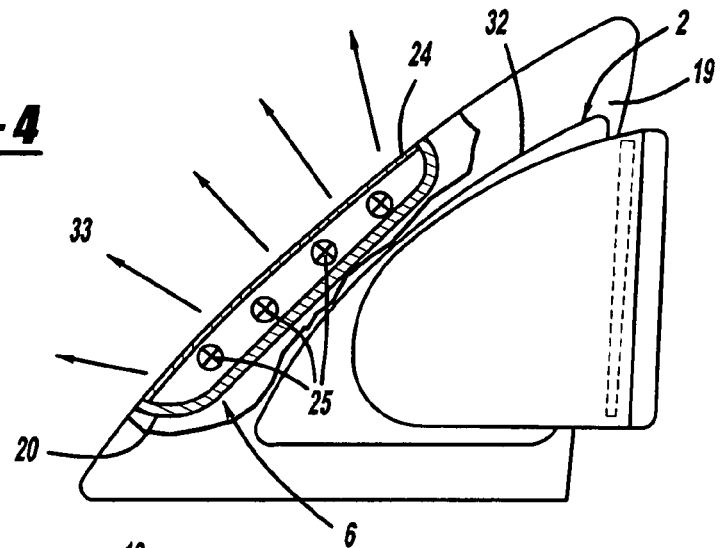
FIG. 4 is a side view, partially in cross-section, of a third embodiment of an exterior rearview mirror, according to the present invention.
Figure 5:
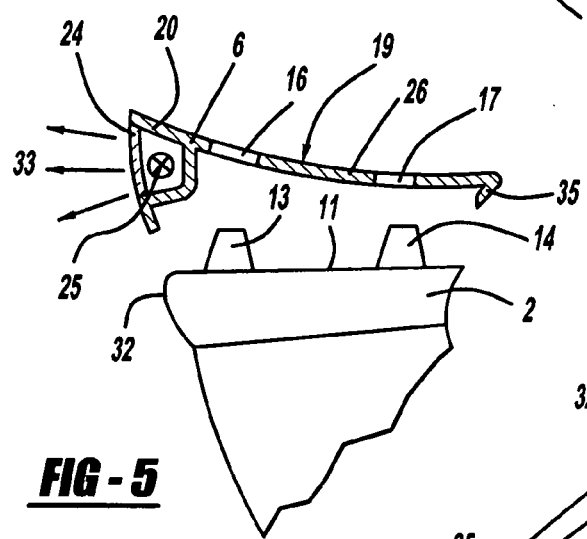
FIG. 5 is a top view and partially exploded view of the exterior rearview mirror shown in FIG. 4.

FIGS. 4 and 5 show an embodiment in which the add-on element 19 is a separate component that is installed between the mirror base 2 and the door panel 3. The periphery of the add-on element 19 extends beyond the mirror base 2 (FIG. 4). The lighting unit 6 of the add-on element 19 is arranged adjacent to the upwardly angled edge 32 of the mirror base 2 that is to the front in the direction of travel. The lighting unit 6 has the housing 20, in which the lighting means 25 are accommodated. The lighting means 25 are arranged inside the housing 20 next to the edge 32 of the mirror base 2. The housing 20 is closed at the front (in the direction of travel) by the lens 24, which is flush with the outside of the add-on element 19. In cross-section (FIG. 5), the lens 24 has a convex curvature. Depending on the design of the add-on element 19, the lens 24 can of course have any other suitable shape in cross-section.

The add-on element 19 has a triangular shape in aspect. The edges of the add-on element 19 are approximately parallel to the edges of the mirror base 2. The add-on element 19 can consist entirely of soft, rubbery material. Of course, an embodiment of the add-on element 19 in a combination of soft and hard dimensionally stable plastic is also possible.

The light emitted by the lighting means 25 emerges through the lens 24 forward in the direction of travel. In this embodiment, the lighting unit 6 constitutes a turn signal repeater lamp.

The housing 20 is designed as a single piece with the rear wall 26 of the add-on element 19. In the installed position, the rear wall makes area contact with the contact wall 11 of the mirror base 2. The base has the sockets 13, 14, which project beyond the contact wall 11, extend through the openings 16, 17 in the rear wall 26 of the add-on element 19 and function together with threaded studs 18 (FIG. 1) during installation of the exterior rearview mirror.

Due to a suitable optical design of the lens 24 or of the lighting unit 6, the light beams 33 of the lighting means 25 can be directed such that they are aimed downward at an angle to the ground. In this case, the lighting unit 6 of the add-on element 19 does not constitute a turn signal repeater lamp, but instead serves as a perimeter light that illuminates the ground area next to the vehicle door.

It is also possible to employ only a part of the lighting means 25 for the perimeter light. Then the lighting unit 6 can be used as both a turn signal repeater lamp and perimeter light. In this case, it is advantageous to be able to operate the lighting means 25 of the perimeter light independently of the lighting means of the turn signal repeater lamp.

Figure 6:
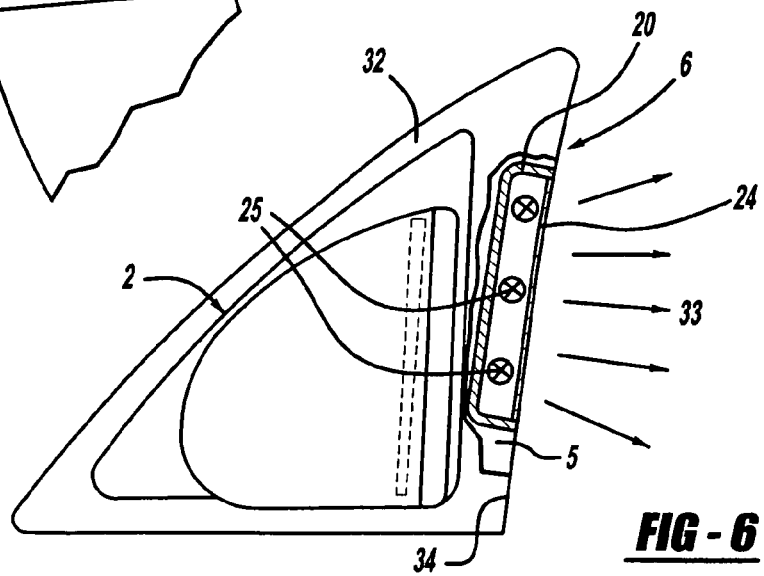
FIG. 6 is a side view, partially in cross-section, of a fourth embodiment of an exterior rearview mirror, according to the present invention.
Figure 7:
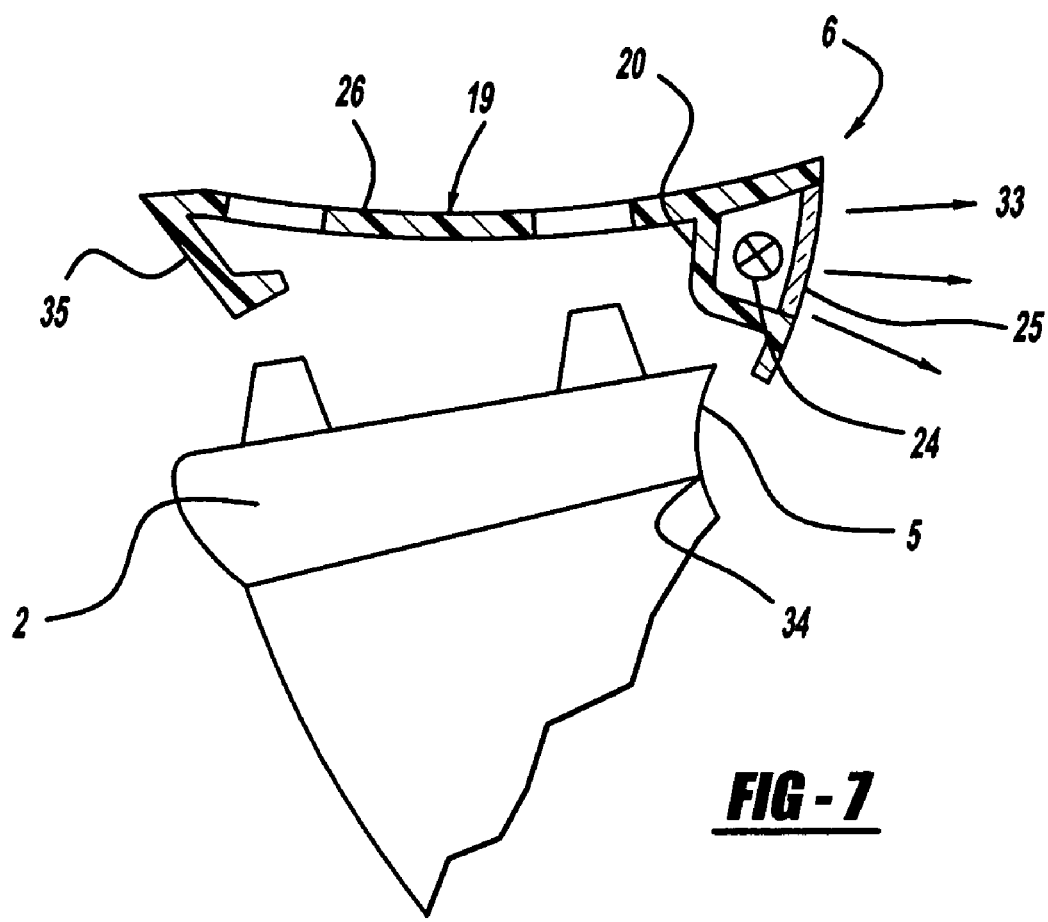
FIG. 7 is a top view and partially exploded view of the exterior rearview mirror shown in FIG. 6.

In the embodiment shown in FIGS. 6 and 7, the lighting unit 6 of the add-on element 19 is located on the rearward (in the direction of travel), upwardly oriented edge 34 of the mirror base 2. The edge 34 is provided with the receiving space 5, designed as a recess, in which the lighting unit 6 lies in the installed position. The housing 20 of the lighting unit 6 makes area contact with the walls of the receiving space 5. The lens 24 is flush with the outside of the edge 34 of the mirror base 2.

Accommodated in the housing 20 are the lighting means 25, which in contrast to the previous embodiment radiate their light to the back when viewed in the direction of travel. The lighting unit 6 can also be used as a turn signal repeater lamp in this case. By means of a suitable optical design of the lighting unit 6, it is possible to direct the light beams 33 opposite the vehicle's direction of travel downward so that the lighting unit 6 serves as a perimeter light. As in the previous example embodiment, the light beams 33 can be guided in the desired direction, for example, by optics on the rear of the lens 24 and/or through reflectors accommodated in the housing 20. Furthermore, it is possible to use only a part of the lighting means 25 for the perimeter lighting, while the remaining part of the lighting means 25 can be used for the turn signal repeater lamp. In corresponding fashion to the previous example, it is useful in such a case to turn on and off the lighting means 25 for the perimeter lighting independently of the other lighting means.

Adjoining the housing 20 is the rear wall 26, which advantageously is designed as a single piece with the housing, and in the installed position makes area contact with the contact wall 11 of the mirror base 2. While the housing 20 is provided on the front edge (viewed in the direction of travel) of the rear wall 26 in the embodiment in FIGS. 4 and 5, in the embodiment in FIGS. 6 and 7 the housing 20 is located on the rear edge (viewed in the vehicle's direction of travel) of the rear wall 26. On the edge opposite the housing 20, the rear wall 26 is sharply bent. This sharply bent edge 35 of the rear wall 26 contacts the front (in the direction of travel) upwardly oriented edge 32 of the mirror base 2.

In all embodiments, the lighting unit 6 is part of the separate add-on element 19, which is placed between the mirror base 2 and the vehicle door. The add-on element 19 is preferably made as a single piece with the lighting unit 6. The add-on element 19 can consist of a hard material, for example a suitable plastic. It is also possible to make the add-on element 19 of flexible material, so that it can simultaneously also serve a sealing function between the exterior rearview mirror, or its mirror base 2, and the door panel 3. It is furthermore possible to make the add-on element 19 partly of a hard material and partly of a flexible material. Thus it is possible, for example, to make the housing 20 of the lighting unit 6 of a suitably rigid material, while the rear wall 26 is made of a flexible material.

Since the add-on element 19 is a separate component from the mirror base, the interior space of the mirror base 2 and, in particular, of the mirror body 1 is available for building in other assemblies. Thus the drives for mirror glass adjustment and for motorized adjustment of the mirror body 1, heating elements for the mirror glass, transmitters for garage door openers, loudspeakers, antennas, GPS modules, and the like can easily be installed in the mirror body 1.

The invention claimed is:

1. An exterior rearview mirror for vehicles, comprising:
   a mirror base;
   a mirror body; and
   at least one lighting unit that is part of an add-on base element that is assembled between the body of a vehicle and a receiving space of the mirror base.

2. The exterior rearview mirror of claim 1 wherein said add-on base element has a vertical wall located between said mirror base and said body of the vehicle.

3. The exterior rearview mirror of claim 2, wherein said lighting unit of said add-on base element is positioned inside a housing that is designed as a single piece with said vertical wall.

4. An exterior rearview mirror for vehicles, comprising:
   an add-on base element that is assembled between the body of a vehicle and a receiving space in a mirror base;
   a housing; and
   a vertical wall of the add-on base element that is designed as a single piece with the housing.

5. The exterior rearview mirror of claim 4 further comprising at least one interlocking part positioned laterally between the inboard side of the vertical wall of the add-on base element and the body of the vehicle.

6. The exterior rearview mirror of claim 5, wherein said interlocking part or parts is composed of latching hooks.

7. The exterior rearview mirror of claim 5 wherein said interlocking part or parts latch to the body of the vehicle.

8. An exterior rearview mirror for vehicles, comprising:
   a mirror base;
   a receiving space in the mirror base; and
   an add-on base element that is assembled between the body of a vehicle and the receiving space in the mirror base and accommodates at least one lighting unit.

9. The exterior rearview mirror of claim 8, wherein said receiving space is composed of a shaped section of said mirror base.

10. The exterior rearview mirror of claim 8 wherein said receiving space is provided on the underside of said mirror base.

11. The exterior rearview mirror of claim 8 wherein said receiving space is provided on the front or back, upwardly oriented edge of said mirror base.

12. The exterior rearview mirror of claim 8 wherein a housing of said add-on base element for the lighting unit rests against an outboard wall of the receiving space.

13. The exterior rearview mirror of claim 12 wherein the underside of the housing is closed by a lens.

14. The exterior rearview mirror of claim 8 wherein said lighting unit is provided as a perimeter light.

15. The exterior rearview mirror of claim 8 wherein said lighting unit is designed as a turn signal repeater lamp.

16. The exterior rearview mirror of claim 8 wherein said add-on base element has openings for mounting parts to said mirror base, and to the body of the vehicle and for cables.

17. The exterior rearview mirror of claim 8, wherein said add-on base element creates a seal with said mirror base receiving area and with said body of the vehicle.

* * * * *